United States Patent Office

3,413,082
Patented Nov. 26, 1968

3,413,082
PROCESS FOR RECOVERING Zr-VALUES FROM ORES
William H. Owens, Milton, Fla., assignor to Pittsburgh Plate Glass Company, Pittsburgh, Pa., a corporation of Pennsylvania
No Drawing. Filed Nov. 13, 1962, Ser. No. 237,381
12 Claims. (Cl. 23—15)

This invention relates to the recovery of zirconium and hafnium values.

Silica and other impurities are in nature found in combination with zirconium and hafnium. Thus, zirconium principally occurs in the form of its silicates such as in zircon, zirkite and like ores. Zircon, one of the more prevalent zirconium ores, has the general composition $ZrO_2 \cdot SiO_2$ and contains a small amount of hafnium, probably as $HfO_2 \cdot SiO_2$. Such ore contains approximately one mole of $SiO_2$ per mole of $ZrO_2$ and $HfO_2$. In addition, the ore often is contaminated with silica present as ordinary silica sand. Small amounts of other impurities such as oxides of titanium, iron, columbium, thorium, uranium or other heavy metals often are present.

In one proposed method for recovering zirconium and hafnium values, such ore is heated with an alkali metal hydroxide or an alkali metal carbonate at a temperature sufficiently high to convert the silica to water soluble form and to produce an alkali metal zirconate. Upon extraction with water, a part of the silica is removed, probably in the form of water soluble alkali metal silicate. The remaining solid contains essentially all of the zirconium and hafnium values, the residue of the silica (rarely substantially greater than about 30 percent thereof) as well as a fairly high concentration of water.

Such solids upon treatment with sulfuric acid or like acid have their zirconium and hafnium values dissolved. Silica, on the other hand, is dispersed through the resulting acid solution in highly colloidal state. In such state, the silica is slow to settle and has a propensity to gel, particularly when the solution is contacted with an organic solvent. Inasmuch as zirconium is separated from hafnium by solvent extraction, the presence of silica in such form is quite objectionable.

This silica apparently is present as very fine silica particles, probably below 15 millimicrons in size, which are very highly hydrated. Silica of this character is either soluble in the aqueous solution or forms a relatively stable colloidal suspension. It has a tendency to dry in the form of hard, flinty particles, which resemble glass. In sufficiently high concentration, it can cause the entire solution to convert into a gel or jelly. This phenomenon is particularly observed when extracting the solution with organic solvents.

One proposal for dealing with this problem digests the aqueous solution with acid in certain high concentrations to precipitate thereby the silica and convert it to a more filterable form. While this can be done, the zirconium, during this treatment, has a tendency to convert to an insoluble form. Consequently, a significant portion of the zirconium often becomes insoluble and, for all practical purposes, unrecoverable.

According to this invention, many of these aforementioned difficulties may be minimized or even substantially circumvented. Thus, in this invention, alkali metal zirconate containing silica is treated with a compound having a metal cation which forms a water insoluble metal silicate and, as a consequence, a substantial portion of the silica is converted into a form which is readily separated from the zirconium.

Thus, it has been found, in accordance with the present invention, that treatment of the alkali metal zirconate (e.g., the water insoluble component obtained by heating zircon or like ore with alkali metal hydroxide or an alkali metal carbonate at elevated temperatures sufficient to convert silica to water soluble form) with calcium oxide or calcium hydroxide (or like material) results in a composition which when upon contact with aqueous acid solution such as nitric acid contains a readily separable solid phase of silica.

In such form, the silica is separated with exceptional facility by filtration or like mechanical expedient from the acid solution of zirconium values. A compact silica filter cake is characteristically obtained. Very little, quite frequently no more than 2 or 3 percent, of the zirconium values (and hafnium values when present) remain with the filter cake, especially if the cake is washed with acid. The filtrate may then be further processed to recover zirconium values.

Alternatively, the silica may be separated by extracting zirconium from the acid solution with an essentially water insoluble organic solvent such as tributyl phosphate. Zirconium along with any hafnium are in this fashion extracted into the organic solvent phase. Even simple phase separation of this organic solution suffices to leave an aqueous phase containing substantially all of the silica and very little, if any, of the zirconium. Silica in this aqueous phase is readily separated by filtration (or other like mechanical expedient) providing filtrate (acid solution) substantially free of silica. If desired, the acid filtrate is accordingly available for use in early steps of the contemplated method.

As a consequence of the invention, silica is separated from zirconium in a form distinguishable physically from gelatinous silica. It often appears to be semicrystalline. Filtration of a nitric acid solution of zirconium in which such silica is present leads to a compact silica filter cake containing but minor amounts of zironium. A considerable portion, if not substantially all, of the zirconium values found initially in such silica filter cake are readily washed with aqueous nitric acid.

In typical practice of the present invention, a conventional zirconium ore such as zircon is heated with alkali metal hydroxide, usually sodium hydroxide, to above about 450° C. or 500° C. and rarely above 700° C. or 800° C. by a procedure substantially as described in United States Letters Patents Nos. 2,962,346 and 2,962,347. This converts a substantial portion of the silica present in the zircon to a water soluble composition, probably water soluble alkali metal silicate, e.g., sodium silicate. Also obtained is a water insoluble composition generally regarded as water insoluble alkali metal zirconate (sodium zirconate). After separation of such water soluble phase, as by simple water leaching, the remaining water insoluble composition, i.e., alkali metal zirconate, is mixed with a compound having a metal cation, a metal silicate of which is substantially water insoluble. Calcium oxide or hydroxide are typical compounds, calcium silicates being substantially insoluble.

The amount of calcium oxide (including calcium hydroxide) or like material admixed with the alkali metal zirconate is usually equivalent to the silica content thereof. That is, ideally a mole equivalent amount of calcium hydroxide is admixed with the alkali metal zirconate, basis the silica equivalent thereof. Considerable latitude, particularly as to the use of larger amounts, often up to two or three mole equivalents or more, is permissible.

Conditions of mixing are variable. For example, only enough water may be added to the alkali metal zirconate-calcium oxide mixture to give rise to a stiff, pasty composition. Alternatively, considerably larger quantity of water may be used to provide a mixture in the form of a slurry. When using procedures involving these larger amounts of water, it is preferable the water temperature be 60° C. or higher (but rarely above 120° C.). Usually, small amounts of water facilitate effective mixing.

In using calcium oxide, calcium hydroxide or like alkaline earth metal oxides or hydroxides pursuant to this invention, the mixture of such compound and alkali metal zirconate is subjected to elevated temperatures, usually above about 450° C. to 500° C. for at least several minutes, more normally about 15 to 60 minutes.

With the use of compounds other than calcium oxide or calcium hydroxide, conditions of heating may be somewhat different. For example, with alkaline earth metal nitrate such as calcium nitrate, heating to a temperature of about 300° C. is adequate.

According to a preferred embodiment hereof, the amount of water present while effecting this change in the nature of the silica in the alkali metal silicate is minimized. Thus, it is preferable that any excess water present with the calcium oxide-alkali metal zirconate mixture be removed. When this mixture is in the form of an aqueous slurry, it is well to filter off water and obtain a dry filter cake. In such filtration step, additional alkali is removed in the filtrate, thus avoiding formation of salts such as sodium nitrate in the subsequent nitric acid solubilizations. Drying at modest temperatures, e.g., up to 200° C., of such mixtures (including such dry filter cake) is also good practice.

A substantial portion, usually 70 percent or more, of the silica ($SiO_2$) in the alkali metal zirconate is transformed according to the principles of this invention into a water insoluble form of silica having little water of hydration, such as calcium silicate. By minimizing the presence of water during this formation and/or by recourse to other reaction conditions, a substantially non-hydrated form is attained. Thus, the siliceous material resulting from heating the composition containing calcium oxide and silica at temperatures and with a minimum of water above 500° C., for example, gives excellent results.

It is further observed that other contaminants (or undesirables) are by this invention converted into a readily filterable nitric acid insoluble form. For example, with a zircon ore having an appreciable thorium, rare earth metal, earth acids such as niobium and tantalum and/or fluoride content, such components are rendered to a large extent insoluble in nitric acid, thus permitting their ready separation from the zirconium values of the ore whether or not silica separation is also involved.

A further benefit reaped as a consequence of this invention is the substantial quantity, frequently nearly all, of the zirconium values of zirconate are in a heat stable form. When sodium zirconate is solubilized with an aqueous acid such as nitric acid, a substantial portion of its zirconium values, on the order of 30 to 40 percent, frequently do not readily solubilize. This phenomenon is especially noticeable when water insoluble sodium zirconate (such as remains after water extracting the fusion products of zircon sand and sodium hydroxide) is heated to temperatures of 110° C. and higher. By virtue of the present invention, the proportion of zirconium in such sodium zirconate which is heat stable is increased appreciably, often to the extent that nearly theoretical solubilization of the zirconium values are obtained in concentrated nitric acid solution even when heating at 110° C. or higher for extended periods.

After converting a substantial portion of the silica in the sodium zirconate into water insoluble metal silicate preferably having little or no water of hydration, the resulting composition is then treated with acid, typically nitric acid. The acid treatment results in solution of the zirconium values and formation of filterable solid silica phase. This solubilization usually is viewed as converting the zirconium to zirconyl nitrate with nitric acid as the solubilizing agent. With sulfuric acid, the form of zirconium is regarded as zirconyl sulfate. Zirconyl chloride results when hydrochloric acid is employed.

Solubilization of the zirconium values by treating with an appropriate acid may be accelerated by various expedients. Thus, with nitric acid, preferable conditions involve use of 8 to 12 N nitric acid and temperatures approximating boiling conditions, e.g., 110° C. to 120° C., for brief periods, e.g., 5 to 15 minutes.

However, it has been found by extending the time period the nitric acid solution is maintained at about 110° C. or higher substantially in excess (e.g., 30 to 90 minutes extra) of that necessary simply to effect solubilization of the zirconium values further enhances the filterability of the silica. Thus, boiling a concentrated nitric acid solution of the sodium zirconate-calcium hydroxide reaction composition for 90 minutes rather than only the 15 minutes normally observed to effect complete solubilization of the zirconium values provides silica which settles with considerable ease and readily forms a compact silica filter cake. Such silica is also in such form that extraction of the silica slurry of the zirconyl solution with an organic extractant such as tributyl phosphate encounters no complications occasioned by gelation of the silica.

Performance of the present invention is illustrated by the following examples:

EXAMPLE I

Alkali metal zirconate frit was prepared from zircon ore as follows:

The zircon sand contained about 66 percent by weight of zirconium calculated as $ZrO_2$, 1.3 percent by weight of hafnium calculated as $HfO_2$ and 32 percent by weight of $SiO_2$. The particle size of the zircon was below about 50 mesh. This zircon was fired with sodium hydroxide in an externally fired, rotating tube kiln 26 feet long and having an internal diameter of 3 feet, heated to a temperature of about 1050° F. to 1150° F.

Dry zircon fed to the kiln at the entry end was continuous and at a rate of about 6.5 pounds per minute. An aqueous solution containing 57 percent by weight of NaOH was fed into the kiln through 8 sprays which were individually supplied by 8 tubes, each ¼ inch in diameter, from a common sodium hydroxide solution source. The first spray was located 5 feet from the feed end of the kiln and the other sprays were spaced 2 feet apart in a row downstream of the kiln from the first spray nozzle. These tubes were enclosed in a cooling tube 4 inches in diameter and provided with a cooling jacket extending along the length of the kiln. The sprays delivered a downwardly directed flat spray extending longitudinally of the kiln, the angle of each spray being about 65 degrees, so that the sprays did not intersect.

Sodium hydroxide solution was introduced into the sprays at a total rate of about 1.3 gallons per minute, each spray being supplied with approximately an equal amount of sodium hydroxide solution. The temperature of the sodium hydroxide solution was held below the boiling point thereof. Water was circulated through the cooling jacket at the rate of about 10 gallons per minute. A dam ring was provided in the kiln to insure provision of a bed depth of about 2 to 5 inches of the reacting zircon, so that the caustic was largely consumed before it reached the kiln wall.

The alkali metal zirconate produced was withdrawn from the exit end of the kiln at a temperature of about 500° F. Approximately 90 percent of the zirconium in the zircon produced was converted to sodium zirconate.

This reaction composition was withdrawn from the kiln and leached with water to provide a leach cake.

Some 453 grams of this leach cake was mixed with 47 grams of calcium hydroxide and just enough water to give the mixture a stiff, pasty texture. This mixture was then dried overnight at 140° C. and thereafter heated to about 550° C. for 30 minutes.

The resulting composition was added to 2 liters of 16

N nitric acid and boiled for 80 minutes at a temperature of about 110° C. to 120° C.

A first portion of the resulting acid slurry was extracted with 1070 milliliters of an equal volume mixture of tributyl phosphate and "Mintrol" (a mixture of paraffinic, aromatic and naphthenic hydrocarbons having a flash point of about 100° F. and a specific gravity of about 0.755 at 20/4° C.). The organic phase contained 98.4 percent of the zirconium and substantially all of the hafnium present initially in the acid slurry subjected to the extraction. In the aqueous phase was substantially all of the silica, calcium and sodium salts of nitric acid, and approximately 1.6 percent of the zirconium present in the original slurry subjected to the slurry extracted. After being separated from the organic phase, the aqueous phase was filtered in a standard Büchner filter using a glass filter medium at room temperature. This filtration was effected with ease.

The balance of the nitric acid slurry comprising the second portion of the slurry was filtered at room temperature using a standard Büchner filter with a glass filter medium. The filtrate constituting some 1550 milliliters of zirconium nitrate solution contained about 0.18 pound $SiO_2$ per 100 pounds Zr. A compact silica filter cake was obtained which (after being washed with 500 milliliters of the aqueous phase resulting from the solvent extraction of the zirconium nitrate filtrate) contained but 3.1 grams Zr, weighed 166 grams and occupied a volume of 112 milliliters.

EXAMPLE II

Some 454 grams of the water leached material prepared as described in Example I was slurried at room temperature in 500 milliliters of water and 43 grams of calcium hydroxide and then vacuum filtered to obtain a filter cake having a dry appearance. This filter cake was heated to 570° C. overnight and then added to 2 liters of 16 N nitric acid. The resulting composition was then boiled (temperature of about 110° C.) for 80 minutes, whereafter the resulting slurry was filtered in a standard Büchner funnel at room temperature. Filtration was accomplished with ease and a compact silica filter cake was obtained. The filtrate contained 88 percent of the zirconium present in the slurry subjected to filtration, indicating at most but slight heat sensitivity of the zirconium present.

In contrast, when the leach cake was treated in a similar fashion except for omitting treatment with the calcium hydroxide, only 30 percent of the zirconium values were found to be present in the filtrate.

EXAMPLE III

One hundred (100) grams of water leached material prepared as described in Example I and 8 grams of calcium hydroxide were slurried in water at a temperature of 60° C. for 60 minutes, whereafter the slurry was vacuum filtered and the filter cake washed with water at 60° C. The filter cake was calcined at 555° C. for 30 minutes and then added to 500 milliliters of 16 N nitric acid. After boiling for 60 minutes, the resulting slurry was filtered in a standard Büchner filter with the filter cake receiving a 20 percent nitric acid wash. The combined washings and filtrate contained 96.5 percent of the available zirconium.

Comparable results were obtained when the water temperature used in forming the slurry of calcium hydroxide and leached material was 80° C. and 100° C.

EXAMPLE IV

In lieu of calcium hydroxide, calcium nitrate was employed in a procedure substantially identical to that described in Example III. However, the calcium nitrate was mixed as an aqueous solution with the leached material in an amount sufficient to provide 5 grams of calcium nitrate per 100 grams of leached material. Calcination was performed at 300° C. Some 97.5 percent of the available zirconium was contained in the filtrate and washing denoting near quantitative recovery.

As illustrated by the foregoing examples, the slurry of silica and zirconium solution may be handled in various alternative procedures to achieve appropriate resolution of the silica from the zirconium. The slurry, for example, may be simply filtered directly. Filtration is readily accomplished, giving rise to a compact silica filter cake. Alternatively, the aqueous silica slurry may be extracted with an organic solvent for the zirconium (and hafnium) to obtain a water immiscible zirconium containing organic phase which may be phase separated from the aqueous phase. Because of the form in which the silica is present, this extraction is greatly facilitated.

In lieu of nitric acid, the procedures described in the working examples and more generally described herein may be replaced entirely or in part by other acids including hydrochloric acid, sulfuric acid, perchloric acid and the like. In general, acids useful in lieu of nitric acid are those which are recognized to form acid soluble zirconium salts.

Moreover, besides calcium hydroxide or calcium oxide employed in the foregoing examples, other soluble alkaline earth metal compounds, particularly metal oxides or hydroxides, are suitable. Mentioned in this connection are magnesium oxide, barium oxide, strontium oxide and the corresponding hydroxides. Various other compounds having metal cations which form water insoluble silicates also may be employed including, by way of illustration, calcium chloride, calcium nitrate, magnesium chloride, barium chloride, strontium chloride, and zinc chloride. Calcium nitrate offers the advantage of being readily available since it is formed as a by-product in conjunction with that embodiment wherein nitric acid is employed to solubilize the zirconium values. This calcium nitrate may be recovered and mixed with water insoluble alkali metal zirconate.

A wide variety of suitable organic extractants useful in conjunction with extracting zirconium values from aqueous solutions thereof are known. Thus, in lieu of the tributyl phosphate organic extractant, other alkyl phosphates and acetates such as are described, for example, in United States Letters Patent No. 2,757,081.

As illustrated in Example I, the organic extractant may be mixed with a diluent. Numerous diluents, such as many petroleum fractions containing aromatic or straight chain hydrocarbons, are of value. Diluent is employed to increase the difference between the specific gravity of the organic and aqueous phases, thus facilitating their phase separation. A considerable difference in specific gravity of the respective organic and aqueous phases bears materially upon the operating effectiveness of an extraction column.

Among other diluents are hydrocarbons such as hexane, n-heptane, n-octane, the n-alkanes with 12, 13 or 14 carbon atoms, methylcyclohexane and carbon tetrachloride.

Acid solutions of zirconium such as are herein provided are treated to recover their zirconium values in useful form. Certain zirconyl salts such as zirconyl sulfate are of value in the tanning industry. Other zirconium compounds, notably zirconium oxide (which can be obtained by heating zirconyl nitrate or other zirconyl salts to be elevated or calcining temperature) are useful as principal constituents for many refractory compositions.

While the present invention has been described by reference to specific details of certain embodiments, it is to be understood that it is not intended the invention be construed as limited thereto.

I claim:

1. In the method of separating the zirconium from the zirconium-silica bearing ore which involves heating the ore at elevated temperature with an alkali selected from the group consisting of alkali metal hydroxide and alkali metal carbonate to convert a substantial portion of the silica to water soluble form and produce a water insoluble alkali metal zirconium component, leaching such water soluble form of silica from the alkali metal zirconate to leave a silica lean alkali metal zirconate residue and thereafter dissolving such alkali metal zirconate residue in acid to solubilize zirconium, the improvement wherein a compound having a metal cation, a silicate of which metal cation is water insoluble, is added to the residue, the resulting mixture is heated prior to dissolving in acid to solubilize the zirconium, whereby to obtain an acid solution of zirconium containing a separable solid phase of silica and such solid phase silica is separated therefrom.

2. The method of claim 1 wherein the metal cation is selected from the group consisting of calcium, magnesium, barium, strontium and zinc.

3. The method of claim 1 wherein the said heating of the mixture is to an elevated temperature of at least about 300° C.

4. The method of claim 1 wherein the silica lean residue is dried at a temperature of up to 200° C. prior to being combined with said compound and wherein the mixture is heated to at least about 300° C. in the presence of a minimum of water to thereby provide silica in a form having at most little water of hydration.

5. The method of claim 1 wherein the zirconium-silica bearing ore contains an appreciable content of a material selected from the group consisting of thorium, niobium, tantalum and fluoride and whereby the improvement renders said material insoluble in the acid to thereby permit ready separation thereof from dissolved zirconium.

6. The method of claim 1 wherein the compound is an inorganic alkaline earth metal compound.

7. The method of claim 1 wherein the alkali metal zirconate is sodium zirconate.

8. The method of claim 1 wherein the acid is aqueous nitric acid.

9. The method of claim 1 wherein the said compound is a calcium oxide.

10. The method of claim 1 wherein the silica is separated by filtration.

11. The method of claim 1 wherein silica is separated by extracting zirconium with organic solvent from the silica slurry in zirconium solution.

12. The method of claim 1 wherein said dissolving in acid is conducted at a temperature of at least 110° C. and said temperature is maintained for at least 30 minutes.

References Cited

UNITED STATES PATENTS

| | | | |
|---|---|---|---|
| 3,009,777 | 11/1961 | Evans et al. | 23—117 |
| 3,095,270 | 6/1963 | Korach et al. | 23—117 |
| 3,119,661 | 1/1964 | Stambaugh et al. | 23—140 |

FOREIGN PATENTS 610,549  10/1948  Great Britain.

OTHER REFERENCES

Beyer et al.: "U.S. Atomic Energy Commission Report—ISC—437 (Rev.)," Aug. 17, 1954, 15 pages (pages 12–14 of particular interest).

OSCAR R. VERTIZ, *Primary Examiner.*

H. T. CARTER, *Assistant Examiner.*